W. L. CANNIFF.
UNION, HOSE AND PIPE COUPLING.
APPLICATION FILED JAN. 2, 1908.
912,809.
Patented Feb. 16, 1909.
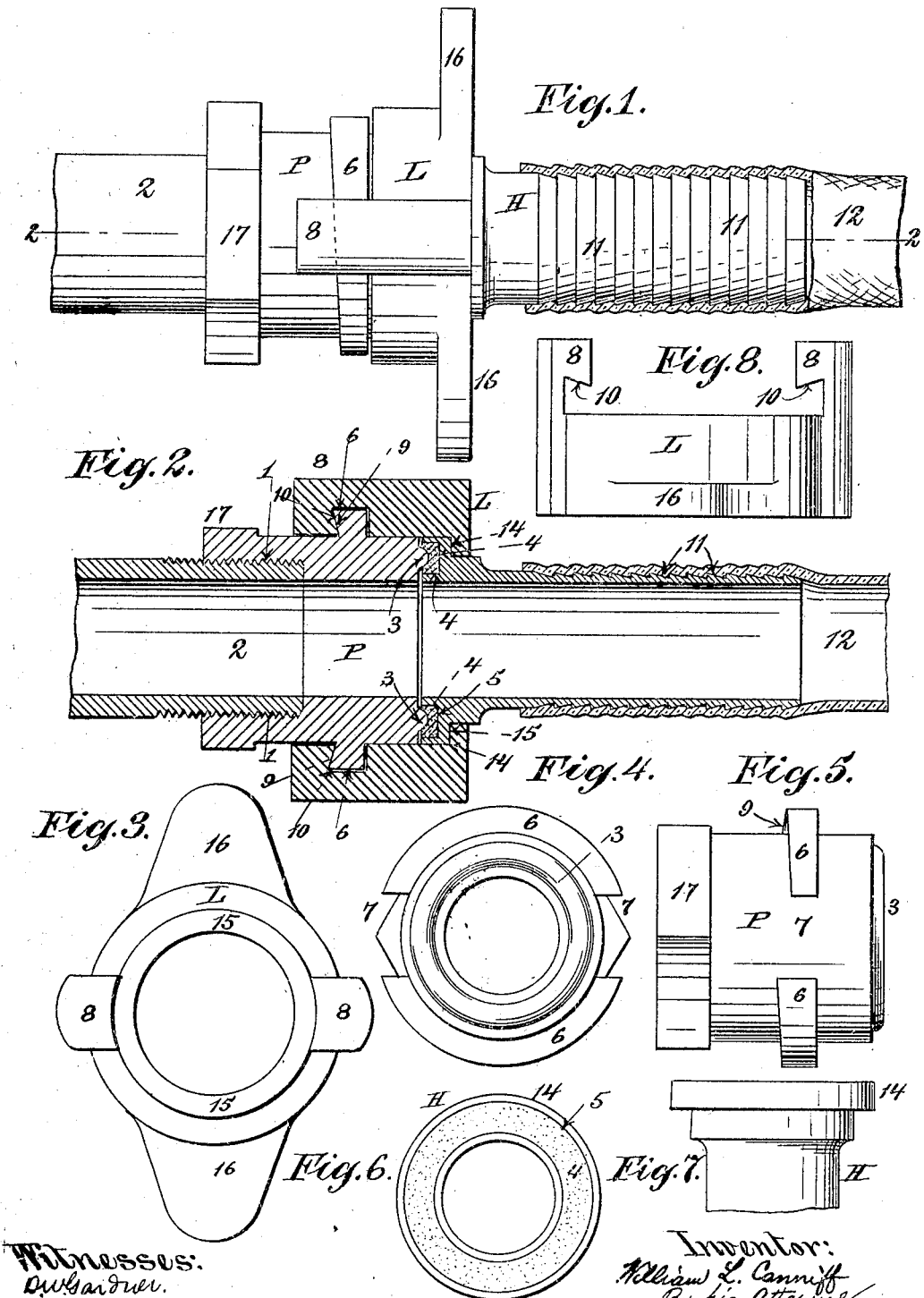

UNITED STATES PATENT OFFICE.

WILLIAM L. CANNIFF, OF NEW YORK, N. Y.

UNION HOSE AND PIPE COUPLING.

No. 912,809.  Specification of Letters Patent.  Patented Feb. 16, 1909.

Application filed January 2, 1908. Serial No. 409,079.

*To all whom it may concern:*

Be it known that I, WILLIAM L. CANNIFF, a citizen of the United States, residing in the borough of Manhattan, city, county, and State of New York, have invented certain new and useful Improvements in Union Hose and Pipe Couplings, of which the following is a specification.

My invention is designed to afford a simple but effective coupling device by which flexible hose may be connected with rigid piping, as where steam or compressed air is used for drilling, mining, tunneling and similar purposes, and it consists in the construction and arrangement of parts hereinafter described and claimed specifically.

In the accompanying drawings, Figure 1, is an elevation of my union hose and pipe coupling; Fig. 2, a central longitudinal section thereof taken upon plane of line 2—2—Fig. 1; Fig. 3, is a face elevation of the locking section; Fig. 4, is an end, and Fig. 5 a side elevation of the pipe section; Fig. 6, is a face view of the hose section, and Fig. 7, an elevation of the inner end thereof; Fig. 8, is a side elevation of the locking section.

The pipe section P is formed at its inner end with a female screw thread 1 for engagement with the male threaded end of a metal pipe 2. The face of the inner end of the pipe section P is formed with an annular convex contact surface 3, for engagement with an opposed annular packing of alloy 4 set in a groove 5 formed for its reception in the inner face of the hose section H. It is obvious in this connection that this arrangement of bearing surfaces may be transposed if desired, with like result,—the convex contact 3 being formed on the inner face of the hose section H and an annular groove 4, being formed in the opposed inner face of the pipe section. Externally the pipe section is formed with a plurality of transversely arranged tapering flanges 6, 6. Two of these are shown in the drawings which is the preferable number, although I do not limit myself in this respect. Between the adjacent ends of these transversely inclined shoulders 6, 6, openings 7, 7, of sufficient width are formed to admit of the passage of the overlapping shoulders 8, 8, on the locking section L. The tapering flanges 6, 6, are preferably formed with inwardly beveled contact faces 9, 9, for engagement with the contact surfaces 10, of the overlapping shoulders 8, which latter contact surfaces 10, 10, are also preferably beveled to correspond to the opposed contact surfaces 9, 9, on the tapering flanges 6, 6. By this means the spreading of the overlapping shoulders is avoided, and absolute security attained.

The outer end and greater portion of the body of the hose section H is preferably formed externally with transverse corrugations 11, 11, or the hose section is otherwise constructed to positively engage and retain the superposed end of the flexible hose 12. The inner end of the hose section H, is formed with an external annular shoulder 14 for engagement with a corresponding annular shoulder 15 on the locking section L.

16 are lateral arms or projections upon the locking section L to facilitate its manipulation; and for a like purpose the pipe section P is formed with a polygonal sided flange 17.

By my construction and arrangement of parts a flexible hose and a metal pipe may be quickly and conveniently coupled together with absolute security, and at the same time a perfect seal is attained.

What I claim as my invention and desire to secure by Letters Patent is,

The improved hose coupling described consisting of a section having at one end a female screw thread and at the other end an annular convex contact surface, said section being formed exteriorly with transversely arranged tapering flanges, said tapering flanges being formed with inwardly beveled contact faces, there being openings between said flanges, and a locking section formed with oppositely disposed overlapping shoulders having beveled contacting surfaces to coincide with the beveled contact surfaces of the first-named section, and with oppositely disposed lateral arms forming handles, and a hose engaging section having a groove at its end with a packing in said groove and engaged by said convex contact surface and an exterior shoulder engaging the shoulder on the locking section.

WILLIAM L. CANNIFF.

Witnesses:
D. W. GARDNER,
GEO. WM. MIATT.